US012793404B2

(12) United States Patent
Scholz et al.

(10) Patent No.: US 12,793,404 B2
(45) Date of Patent: Nov. 10, 2026

(54) MONITORING OF A MODEL AND ANOMALY DETECTION

(71) Applicant: Robert Bosch GmbH, Stuttgart (DE)

(72) Inventors: Bjoern Scholz, Stuttgart (DE); David Kulicke, Renningen (DE); Harald Walter, Rutesheim (DE); Hoang Trinh, Gerlingen (DE); Holger Kahle, Stuttgart (DE); K B Mohan Kishor, Coimbatore (IN); Marcio Jose De Menezes, Jr., Munich (DE); Peter Fruehberger, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 592 days.

(21) Appl. No.: 18/360,090

(22) Filed: Jul. 27, 2023

(65) Prior Publication Data

US 2024/0037933 A1 Feb. 1, 2024

(30) Foreign Application Priority Data

Jul. 28, 2022 (DE) ..................... 10 2022 207 776.8

(51) Int. Cl.
*G06V 10/98* (2022.01)
*G06V 10/776* (2022.01)

(52) U.S. Cl.
CPC ............ *G06V 10/98* (2022.01); *G06V 10/776* (2022.01)

(58) Field of Classification Search
CPC ............................. G06V 10/98; G06V 10/776
See application file for complete search history.

(56) References Cited

U.S. PATENT DOCUMENTS

| | | | | |
|---|---|---|---|---|
| 2021/0097432 | A1* | 4/2021 | Olgiati | G06F 17/18 |
| 2022/0043441 | A1* | 2/2022 | Huang | H04L 63/123 |
| 2022/0100601 | A1* | 3/2022 | Baum | G06F 11/1004 |
| 2022/0236762 | A1* | 7/2022 | Kopetz | G06F 1/12 |
| 2022/0261307 | A1* | 8/2022 | Kimura | G06F 11/0739 |

* cited by examiner

*Primary Examiner* — David Perlman
(74) *Attorney, Agent, or Firm* — NORTON ROSE FULBRIGHT US LLP

(57) ABSTRACT

System and computer-implemented method for monitoring a function model for providing data for at least one function of a computer-controlled machine, in particular an image recognition algorithm.

12 Claims, 3 Drawing Sheets

MONITORING OF A MODEL AND ANOMALY DETECTION

BACKGROUND INFORMATION

Machine learning models are increasingly being used as a result of the widespread use of computer vision algorithms, for example, in vehicles. An increasing number of cameras inside and outside the vehicle observe the interior and exterior vehicle surroundings at all times.

Machine learning models are used, for example, on high-performance Systems-on-Chip (SoCs), which generally use various types of hardware accelerators to ease the workload of the CPU cores.

In principle, it has to be ensured that both the machine learning model and the hardware that executes it function as expected. Requirements regarding the safety of the provided functionality are covered, for example, in ISO standard 21448.

In addition, requirements regarding the functional safety are to be set according to ISO standard 26262. This is significant, for example, if, in terms of ISO standard 26262, unsafe operating systems or unsafe hardware accelerators are used. In general, it is rarely the case that a complex system including an SoC and further technical components, such as working memory, voltage supply, etc., is entirely made up of components developed according to ISO 26262. Therefore, a critical path, which is particularly secured, is often explicitly defined for such systems.

SUMMARY

The present invention provide a method for monitoring a model. One specific embodiment of the present invention relates to a computer-implemented method for monitoring a function model for providing data for at least one function of a computer-controlled machine, in particular an image recognition algorithm, the function model determining at least one intermediate result based on input data in at least one first processing step, and the function model determining an output of the function model based on the intermediate result in at least one further processing step, and the intermediate result and the output of the function model being provided to a monitoring model for anomaly detection, and anomaly detection being carried out based on the intermediate result and output of the function model, and at least one step being carried out to validate a functionality of the function model and/or a functionality of the monitoring model. The intermediate results of the at least one first processing step and the output of the function model are linked in this case, meaning that in the case of an error, i.e., the presence of an anomaly, the error is propagated through the execution chain.

A function model is understood in the scope of the present summary of the present invention as a model, in particular an algorithm, which is capable of providing data for at least one function of a computer-controlled machine.

One example of such a model is a hardware-based and/or software-based image recognition algorithm, which is designed to determine output data based on input data, in this case in particular digital image data. Such an algorithm is, for example, a classification algorithm. However, it may prove to be advantageous in conjunction with anomaly detection for the model to be a regression algorithm. However, this does not preclude the model or an application downstream from the model from carrying out a final classification.

According to an example embodiment of the present invention, it is provided that the function model determines at least one intermediate result based on input data in at least one first processing step, for example based on inference. In at least one further processing step, for example, a postprocessing step, the function model determines the output of the function model based on the intermediate result.

Both the intermediate result and the output are subjected to anomaly detection using a monitoring model. During anomaly detection, the results of the monitored function model are checked for anomalies, for example so-called outliers. One challenge of anomaly detection is to distinguish between real "outliers," which are based on an incorrect execution of a target function, and false "outliers," in which rare events having abrupt changes of the inputs result in just such outliers. Not every outlier means an incorrect execution of an intended function. Therefore, the identification of outliers alone is often not sufficient as the sole basis for concluding incorrect execution of a target function of the function model. To the contrary, outliers are generally not an indication that an error event to be detected has actually occurred.

According to the present invention, it is therefore provided that the anomaly detection be supplemented by at least one step for validating a functionality of the function model and/or a functionality of the monitoring model.

For example, the carrying out of a so-called "built-in" self-test (BIST) is provided to validate the functionality of the function model.

According to an example embodiment of the present invention, it is provided, for example, that the method includes: determining a reference output based on a reference input with the aid of the function model, and checking the reference output, in particular comparing the reference output to ground truth data, with the aid of the monitoring model. A reference input is stored, for example, in a corresponding memory device and is provided to the function model. The term "ground truth data" is understood here to mean that these data represent a reference that describes a reality of the reference data sufficiently accurately for the particular purpose. In other words, ground truth data are observed or measured data that were objectively analyzed.

By checking the reference output with the aid of the monitoring model, it is possible to check on the basis of known reference data whether the function model is functional. For the case that the function model includes a classification algorithm, it is advantageous if the reference inputs cover various classes, in particular all classes.

According to an example embodiment of the present invention, it may be provided that the determining of a reference output based on a reference input with the aid of the function model and the comparing of the reference output to ground truth data with the aid of the monitoring model are executed periodically. The execution may be triggered, for example, by providing at least one reference input.

According to an example embodiment of the present invention, it may be provided that the determination of the reference output based on the reference input with the aid of the function model is carried out during a normal operation, i.e., an intended operation, of the function model. However, it may also be that the function model switches into a test mode. This is advantageous, for example, if the function model includes an algorithm, the mode of operation of which would be influenced during normal operation by the use of reference data. Examples of this are recurrent neural networks (RNNs), which implement an internal state. A reference input would influence the internal state and thus also the following predictions.

Additionally or alternatively, according to an example embodiment of the present invention, further steps may be provided to validate the functionality of the function model. The method includes the following steps, for example: providing a hash value with the aid of the monitoring model, signing the hash value with the aid of the function model, providing the signed hash value to the monitoring model, and checking the signed hash value, in particular comparing the hash value to the signed hash value, with the aid of the monitoring model.

The monitoring model generates, for example, a random number and uses this number to generate a hash value. The hash value is then provided to the function model. The hash value is a non-mathematically invertible function, in order to ensure that the function model is not able to reproduce the original value itself.

The signing of the hash value by the function model includes, for example, the application of a reversible function to the hash value. The monitoring model checks the signed hash value by applying the inverse and comparing the hash value to the originally generated hash value.

According to one specific example embodiment of the present invention, it is provided that the signing of the hash value includes: adding a signature to the hash value in the first processing step of the function model and adding a further signature in at least one further processing step of the function model. For the case that the function model includes further processing steps, it is provided that signatures are also added in the further processing steps. Subsequent processing steps of the function model thus apply their signatures, i.e., reversible function, to the signed hash value of the particular preceding processing step, in order to thus ultimately generate a final signed hash value that is then provided to the monitoring model.

According to an example embodiment of the present invention, it is advantageously provided that the intermediate result is determined and a signature for the hash value is generated using the function model in the first processing step. The intermediate result and the signed hash value are transferred to at least one further processing step. In the further processing step, the function model determines the output of the function model and also a signature for the signed hash value of the preceding step based on the intermediate result. It is thus provided that each processing step transfers a generated intermediate result and the signed hash value to the next processing step. The final signed hash value is then transferred together with the output to the monitoring model.

According to one specific example embodiment of the present invention, it is provided that the method furthermore includes: monitoring a communication between a first instance on which the function model is executed and a further instance on which the monitoring model is executed. Delays in the communication are able to be detected by the monitoring, for example. If certain delays exceed a defined limit, it is not ensured that the monitoring is still functioning correctly.

According to one specific example embodiment of the present invention, it is provided that, as a function of a result of the anomaly detection and/or as a function of a result of the monitoring of the communication, at least one of the following steps is executed: a) checking the result of the comparison of the reference output to ground truth data with the aid of the monitoring model, b) checking the result of the comparison of the hash value to the signed hash value with the aid of the monitoring model, c) providing a control signal for activating the computer-controlled machine, in particular at least one part of the computer-controlled machine, and/or a function of the computer-controlled machine, d) transferring the computer-controlled machine, in particular at least one part of the computer-controlled machine, and/or a function of the computer-controlled machine into a defined state, e) transferring the computer-controlled machine, in particular at least the part of the computer-controlled machine, and/or the function of the computer-controlled machine into the defined state as a function of a result from a) and/or b).

A defined state is, for example, a safe state. A safe state is understood to mean that the computer-controlled machine and/or the function of the computer-controlled machine is transferred into a state in which an execution of the function is not based on the function model, for example, by switching off or interrupting the function. In addition, it is advantageously provided that the switching off or interruption of the function, in particular the component that executes this function, and/or the computer-controlled machine is announced to another system, for example, an E/E system of a motor vehicle and/or a user of the system. An example of a safe state for specific functions and/or computer-controlled machines in a motor vehicle is a visual display on a display screen, for example also in the form of a black display screen, a signal light, and/or an acoustic warning.

Other specific example embodiments of the present invention relate to a system for monitoring a function model for providing data for at least one function of a computer-controlled machine, in particular an image recognition algorithm, the system being designed to carry out steps of a method according to the described specific embodiments with the aid of a monitoring model, at least steps of the method which are executed with the aid of the monitoring model being executed on at least one first instance of the system, and the function model for providing data for at least one function of the computer-controlled machine, in particular the image recognition algorithm, being executed on at least one second instance of the system.

To meet safety requirements according to ISO standard 26262, it may be provided, for example, that the function model is executed on an application processor, which is safe according to ISO standard 26262 and includes a safe operating system, and the monitoring model is located on the same system. In such a scenario, the function model and the surrounding system are already safe from the viewpoint of functional safety, since the implementation is in accordance with ISO 26262. However, it is not always possible to provide such an implementation, for example, for reasons of cost.

According to an example embodiment of the present invention, it may advantageously be provided that at least the first instance meets a safety integrity level, for example Automotive Safety Integrity Level (ASIL) according to ISO standard 26262.

According to an example embodiment of the present invention, it may advantageously be provided that the first and the second instance are each designed as an instance of a common System-on-Chip (SoC), an operating system which is associated with the first instance being executable on a separate computing core of the System-on-Chip. Freedom from interference may be achieved in this way.

According to an example embodiment of the present invention, it may advantageously be provided that the first and the second instance are implemented on a distributed system. It may also be provided that the first instance is provided by a first processor and the second instance is provided by a second separate co-processor. The communication between these instances has to have an appropriate safeguard, which ensures the integrity of the messages, the authenticity of the messages, and the completeness of all transmitted messages.

According to an example embodiment of the present invention, it may advantageously be provided that a corresponding certified hypervisor virtualizes a hardware level and the first instance provided by the hypervisor is a first domain and the second instance provided by the hypervisor is a further domain.

Further specific embodiments of the present invention relate to the use of the method according to the specific embodiments and/or use of the system according to the specific embodiments in a computer-controlled machine, for example, an E/E system of a motor vehicle, in particular for providing functions of autonomous driving, semiautonomous driving, and/or driver assistance functions, a robot, a domestic appliance, a power tool, a manufacturing machine, a device for automatic optical inspection, or an access system, a function model in the computer-controlled machine providing data for at least one function of the computer-controlled machine based on input data, in particular digital image data of an image sensor, in particular a video, radar, LiDAR, ultrasonic, movement, or thermal imaging sensor, and at least one control signal for executing the function of the computer-controlled machine being provided based on the data, and the function model monitoring according to the method, and/or the computer-controlled machine, in particular at least a part of the computer-controlled machine, and/or a function of the computer-controlled machine being transferred to a defined state.

Further advantages result from the description and the figures. Exemplary embodiments of the present invention are shown in the figures and will be explained in more detail in the following description. Identical reference numerals in various figures each identify elements that are identical or at least comparable in their function. Reference is also made as applicable to elements of other figures in the description of individual figures.

DETAILED DESCRIPTION OF EXAMPLE EMBODIMENTS

Figure 1:
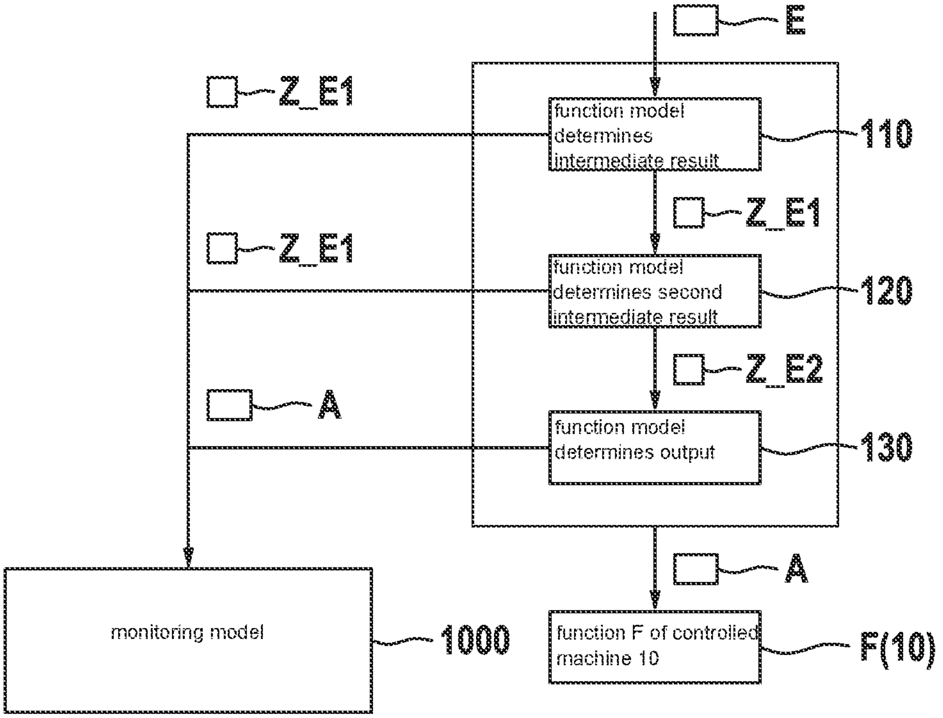
FIG. 1 shows a schematic overview of steps of a method for monitoring a function model with the aid of a monitoring model according to a first specific example embodiment of the present invention.

FIG. 1 schematically shows a function model 100. Function model 100 is, for example, a machine learning model, in particular an algorithm, which is suitable for providing data for at least one function F of a computer-controlled machine 10.

One example of such a model is an image recognition algorithm, which is designed to determine output data based on input data, in this case in particular digital image data. Such an algorithm is, for example, a classification algorithm. However, it may prove to be advantageous in conjunction with an anomaly detection for the model to be a regression algorithm. However, this does not preclude the model or an application downstream from the model from performing a final classification.

Machine learning models are used in different fields, for example, in the automotive field, for example, in the field of autonomous or semiautonomous driving or in the field of driver assistance functions, in which high safety requirements are to be met. In the automotive field, both requirements for functional safety according to ISO standard 26262 and requirements for Safety Of The Intended Functionality (SOTIF) according to ISO 21448 are to be met.

Functional safety according to ISO 26262 is understood as intrinsic safety against malfunctions, i.e., safeguards against self-caused malfunctions. These include, for example, hardware-specific aspects and aspects of software implementation. SOTIF according to ISO 21448 may be generally defined as the absence of an unreasonable risk due to a hazard resulting from an insufficiency in the specification or performance restrictions in the implementation. This includes, for example, the functionality of the software implementation.

Figure 2:
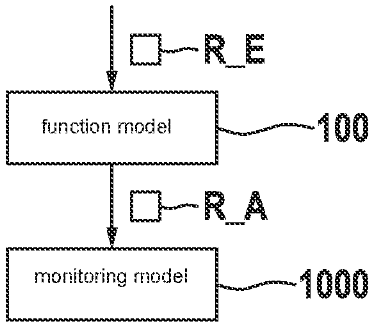
FIG. 2 shows a schematic overview of steps of a method for monitoring a function model with the aid of a monitoring model according to another specific example embodiment of the present invention.
Figure 3:
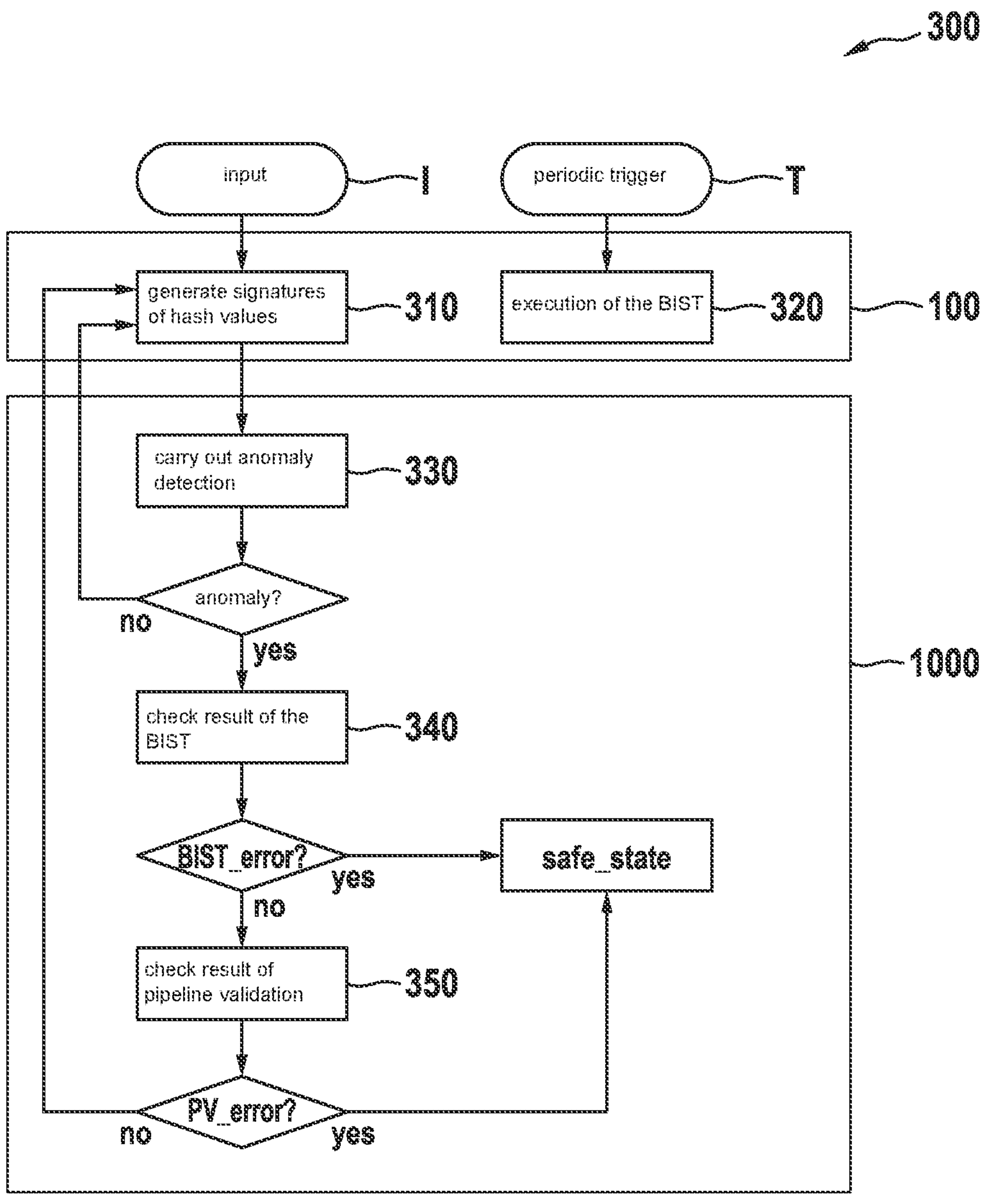
FIG. 3 shows a schematic overview of steps of a method for monitoring a function model with the aid of a monitoring model according to another specific example embodiment of the present invention.

With reference to FIGS. 1 through 3, first a method for monitoring the function model, which meets both the requirements for functional safety according to ISO standard 26262 and the SOTIF requirements according to ISO standard 21448, is described.

With reference to FIGS. 1 through 3, it is presumed that at least one monitoring model, a type of supervisor, for monitoring function model 100 is executed in a safe environment, in particular hardware, in order to meet the hardware-specific aspects according to ISO 26262 and ISO 21448.

Function model 100 determines at least one intermediate result Z_E1 based on input data E, for example, image data, in at least one first processing step 110.

According to the example, function model 100 includes a second processing step 120 and a third processing step 130. In second processing step 120, function model 100 determines a second intermediate result Z_E2 based on first intermediate result Z_E1. In third processing step 130, function model 100 determines an output A based on second intermediate result Z_E2. Output A is provided, for example, as data for at least one function F of a computer-controlled machine 10, for example, a function of an E/E system of a motor vehicle.

According to the example, it is provided that both intermediate results Z_E1, Z_E2 and output A of function model 100 are provided to a monitoring model 1000 for anomaly detection.

Monitoring model 1000 carries out anomaly detection based on intermediate results Z_E1 and Z_E2 and output A of function model 100. During anomaly detection, the intermediate results of monitored function model 100 are checked for anomalies, for example, so-called outliers. One challenge of anomaly detection is to distinguish between real "outliers," which are based on an incorrect execution of an intended function, and false "outliers," in which rare events having abrupt changes of the inputs result in just such outliers. Therefore, not every outlier indicates a problem. Consequently, the identification of outliers alone is often not sufficient as the sole basis for concluding incorrect execution of a target function of the function model.

It is therefore provided that in addition to anomaly detection, at least one step for validating a functionality of function model 100 and/or a functionality of monitoring model 1000 is carried out.

To validate the functionality of function model 100, for example, a so-called "built-in" self-test (BIST) is executed. This will be explained in conjunction with FIG. 2.

It is provided, for example, that the method includes: determining a reference output R_A based on a reference input R_E with the aid of function model 100 and checking reference output R_A, in particular comparing reference output R_A to ground truth data, with the aid of monitoring model 1000. A reference input R_E is stored, for example, in a corresponding memory device and is provided to function model 100. By checking reference output R_A with the aid of monitoring model 1000, it may be checked on the basis of known reference data whether function model 100 is functional. For the case that function model 100 includes a classification algorithm, it is advantageous if reference inputs R_E cover various classes, in particular all classes.

It may be provided that the determining of a reference output R_A based on a reference input R_E with the aid of function model 100 and the comparing of reference output R_A to ground truth data with the aid of monitoring model 1000 are executed periodically. The execution may be triggered, for example, by providing reference input R_E.

As shown in FIG. 1 and described in reference thereto, the function model, which processes input E to form output A, includes multiple processing steps, also called stages. The processing steps may be executed linearly in succession, for example, in the sense of a linear process pipeline, for example. In other applications (not shown), the processing steps may also be connected to one another in the form of a directed acyclic graph.

Steps that may be executed to validate the functionality of the function model are described hereinafter. Steps are provided to check whether a particular processing step is executed and thus contributes to output A. These steps may also be summarized as a pipeline validation.

For example, the following steps are provided:

Monitoring model 1000 provides a hash value h. This is carried out, for example, by generating a random number z and generating a hash value h(z). Hash value h(z) is then provided to function model 100. Hash value h(z) is a non-mathematically invertible function to ensure that function model 100 is not able to reproduce the original value itself. Since it is not possible to preclude an incorrect transfer to the function model or between the steps within the function model, it is not ensured that provided hash value h(z) corresponds to the received value in the function model, because of which the notation h'(z) or h', which is only identical to h(z) or h in the good case, is used in the function model.

In first processing step 110 of function model 100, intermediate result Z_E1 is generated based on input E. Hash value h'(z) is then signed, for example by applying a reversible function s1, for example, h'os1(z).

Intermediate result Z_E1 generated in the first processing step is provided together with signed hash value h'(z)os1 to second processing step 120.

In second processing step 120, function model 100 determines a second intermediate result Z_E2 based on first intermediate result Z_E1. Signed hash value h'(z)os1 is then signed once again, for example, by applying a reversible function s2, for example, h'(z)os1os2.

Intermediate result Z_E2 generated in second processing step 120 is provided together with signed hash value h'(z)os1os2 to third processing step 130.

In third processing step 130, function model 100 determines an output A based on second intermediate result Z_E2. Signed hash value h'(z)os1os2 is then signed once again, for example, by applying a reversible function s3, for example, h'(z)os1os2os3.

In the last processing step, so to speak, the final signature is generated S(z)=h'(z)os1os2os3o . . . .

Final signature S(h'(z)) is provided together with output A to monitoring model 1000. Monitoring model 1000 checks final signature S(h'(z)). Monitoring model 1000 applies, for example, the inverse of reversible signatures s'n . . . s'1 in succession, for example, S(h'(z))os'n . . . os'1=h"(z). Thus determined hash value h"(z) is then compared to originally generated hash value h(z). The initial transfer may be based on an erroneous transmission of h(z), resulting in the function model performing calculations using an h'(z) that differs from h(z). Furthermore, in the case of incorrect steps, the signatures may not be applied correctly. Consequently, after back-calculation in the monitoring model, a third h"(z), which corresponds to neither h(z) nor h'(z), is calculated. In the good case, h=h'=h".

With this expansion, we ensure that the initial transmission of hash value h(z) is also taken into consideration.

Monitoring model 1000 thus tests determined hash h"(z) for equivalence with original h(z), z only being known to monitoring model 1000. If the two hash values correspond, it is validated that each processing step of function model 100 has functioned.

It may prove to be advantageous for the described pipeline validation to be carried out based on an input E in each iteration, i.e., for each pass through the function model.

It may be advantageous for a new value for random number z to be generated in each iteration. It may thus be ensured that the individual processing steps are newly challenged in each iteration and it is not possible to use constant signatures. A function which is simple but nonetheless difficult to reverse is, for example, a simple binary XOR operation designated by the operator ⊗, since it is a self-inverse function:

$$(s \circ s)(h)=s(s(h))=h \text{ and } h \otimes s \otimes s=h.$$

To prevent the reversible functions of each processing step from being permanently coded in the monitoring model, it may be provided that a particular processing step generates signature sn on the basis of original h(z) and the particular processing step, for example, sn(z)=h(z)+h(n). In this case the monitoring model only has to know the number of pipeline steps n for the reversal of sn.

It may prove to be advantageous if the pipeline validation remains active during a running BIST, i.e., a BIST and the pipeline validation are executed together. It may thus be ensured that each processing step of function model 100 is actually executed even during a BIST.

An exemplary sequence of a method 300 for monitoring function model 100 is described hereinafter with reference to FIG. 3.

Based on an input I, for example, including inputs E and hash values h, function model 100 executes processing steps 110, 120, 130, and, if necessary, generates the corresponding signatures for the hash values as described above. This is summarized by way of example in step 310.

A periodic trigger T, which triggers the execution of the BIST, is shown in the example. The execution of the BIST is summarized by way of example in step 320.

Monitoring model 1000 carries out anomaly detection. This is summarized by way of example in step 330.

If an anomaly is detected, monitoring model 1000 carries out further steps to distinguish between real "outliers," which are based on an incorrect execution of an intended function, and false "outliers," in which rare events having abrupt changes of the inputs result in just such outliers. Not every outlier means incorrect execution of a target function of the function model.

If an anomaly is detected, monitoring model 1000 checks the result of the BIST in step 340 in the example.

If a BIST error is detected, it is concluded that incorrect execution of function model 100 is present. It may be provided that a safe state safe state is then directly established. This will be explained.

If no BIST error BIST_error is detected, monitoring model 1000 checks the result of the pipeline validation in step 350 in the example.

If a pipeline validation error PV_error is identified, it is concluded that there is an incorrect execution of function model 100. It may be provided that a safe state safe state is directly established.

If no pipeline validation error is detected, it is concluded that it is a so-called false outlier, and there is no incorrect execution of function model 100.

According to one specific embodiment, it is provided that the method furthermore includes: monitoring a communication between a first instance on which function model 100 is executed and a further instance on which monitoring model 1000 is executed. For example, delays in the communication may be detected by the monitoring. If certain delays exceed a defined limit, it is not ensured that monitoring is still functioning correctly. A safe state may also then be triggered, for example.

A safe state is understood to mean that computer-controlled machine 10 and/or function F of computer-controlled machine 10 is transferred to a state in which an execution of function F is not based on function model 100, for example, by switching off or interrupting function F. It is additionally advantageously provided that the switching off or interruption of function F, in particular the component that executes this function, and/or the computer-controlled machine, is announced to another system, for example, an E/E system of a motor vehicle and/or a user of the system.

The described monitoring functions of the supervisor meet both the requirements of ISO 26262 and the requirements of the SOTIF standard ISO 21448:

The anomaly identification checks whether function model 100 functions as expected with a real input E and therefore falls under the SOTIF standard.

The BIST is based on a reference input R_E and therefore may not check a SOTIF aspect. The BIST is used to check whether the function model is still active and functional. The BIST therefore falls under ISO standard 26262 for functional safety.

The pipeline validation takes place in combination with real inputs E. However, the pipeline validation also checks whether the function model is still active and functional. The pipeline validation therefore meets both the SOTIF standard and ISO 26262.

The communication is monitored for delays on real inputs E. However, a check is also performed to determine whether the function model is still active and functional. The monitoring of the communication for delays, therefore, meets both the SOTIF standard and ISO 26262.

Various hardware configurations for various applications will be explained on the basis of FIGS. 4 and 5.

Figure 4:
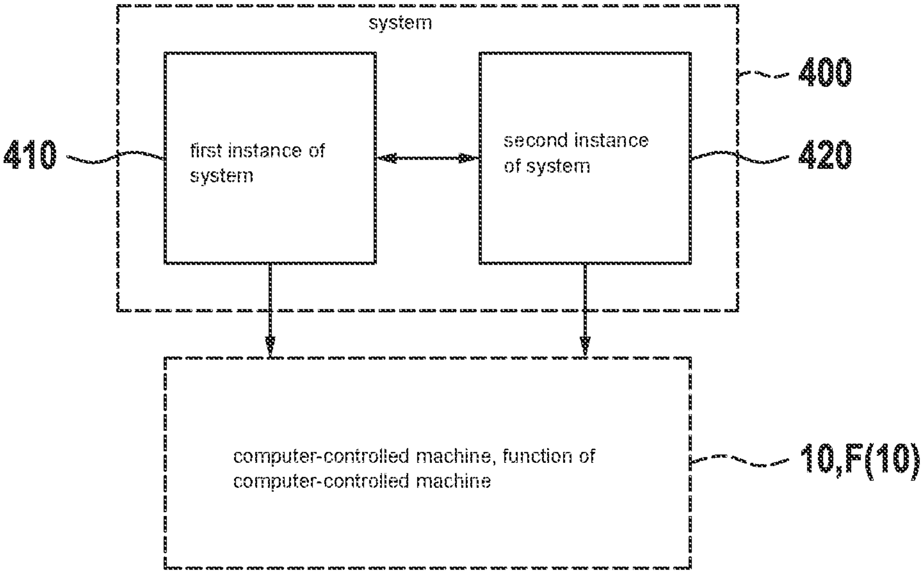
FIG. 4 shows a schematic overview of a system for monitoring a function model with the aid of a monitoring model according to a first specific example embodiment of the present invention.

FIG. 4 shows a system 400, which is designed to carry out steps of the described method with the aid of a monitoring model 1000. It is provided that steps of the method that are executed with the aid of monitoring model 1000 are executed on at least one first instance 410 of system 400, and function model 100 for providing data for at least one function F of computer-controlled machine 10, in particular the image recognition algorithm, is executed on at least one second instance 420 of system 400.

Second instance 420 is, for example, an instance that is considered not safe in terms of the standard for functional safety ISO 26262, for example, due to the use of a non-safe operating system or a non-safe hardware accelerator. For example, function model 100 is based on a Linux operating system. However, the Linux kernel lacks safety certification according to ISO 26262. For safety reasons and for other reasons such as starting times or CAN assistance, the Linux domain is often used together with another domain, which is often used on a separate coprocessor or a guest system of a hypervisor-based solution. This domain generally includes a small real-time operating system (RTOS) having fast start times, which transmits and receives on the vehicle connectivity bus, such as CAN, Ethernet, and others. Due to its simplicity, this domain may also be certified for safety-relevant applications. The first instance is, for example, to be assigned to the safe domain. It is therefore provided that at least the first instance meets an Automotive Safety Integrity Level (ASIL) according to ISO standard 26262.

First and second instances 410, 420 may be formed on separate chips. However, it may also be provided that first and second instances 410, 420 are each formed as an instance of a common System-on-Chip (SoC), an operating system that is assigned to the first instance being executable on a separate computing core of the System-on-Chip, so that safety is ensured.

It may also be provided that first and second instances 410, 420 are implemented on a distributed system. It may also be provided that first instance 410 is provided by a first processor and second instance 420 is provided by a second separate co-processor. The communication between these instances has to have a corresponding safeguard that ensures the integrity of the messages, the authenticity of the messages, and the completeness of all transmitted messages.

Figure 5:
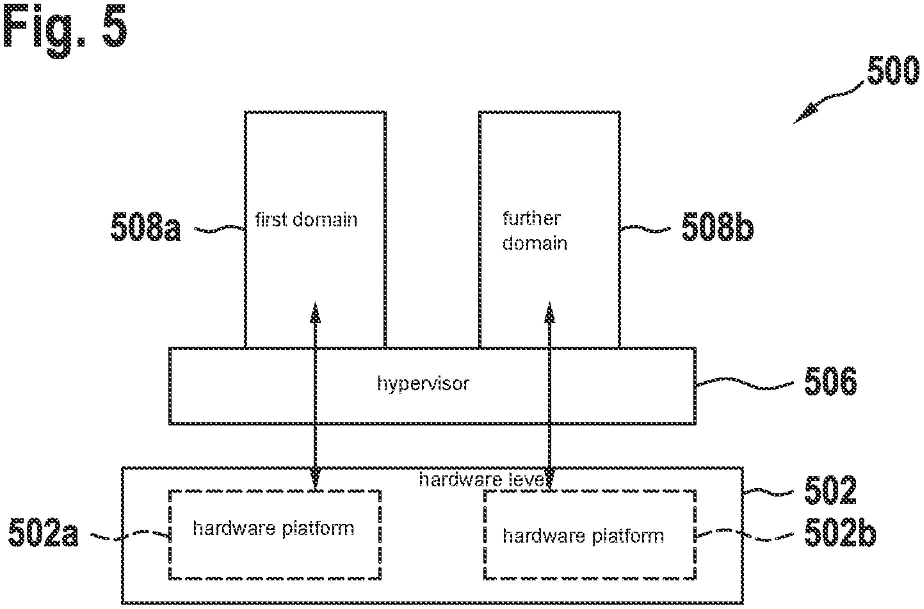
FIG. 5 shows a schematic overview of a system for monitoring a function model with the aid of a monitoring model according to a first specific example embodiment of the present invention.

It may also be provided that system 400 is a virtualized system 500, cf., for example, FIG. 5.

According to the specific embodiment shown, system 500 includes two hardware platforms **502*a*, 502*b*, which form a hardware level 502**.

Hardware platforms **502*a*, 502*b*** include, for example, hardware units such as microcontrollers, safe hardware resources, hardware routing chips.

System 500 includes a hypervisor 506. Hypervisor 506 virtualizes hardware platforms **502*a*, 502*b*. First instance 410 is, for example, a first domain 508*a* provided by the hypervisor and second instance 420 is, for example, a further domain 508*b* provided by hypervisor 506**.

A particular domain designates a specific area of an overall functionality provided by system 500.

What is claimed is:

1. A computer-implemented method for monitoring a function model for providing data for at least one function of a computer-controlled machine, the at least one function including an image recognition algorithm, the function model being configured to determine at least one intermediate result based on input data in at least one first processing step, and the function model being configured to determine an output of the function model based on the intermediate result in at least one further processing step, the method comprising the following steps:

providing the intermediate result and the output of the function model to a monitoring model for anomaly detection;

carrying out anomaly detection based on the intermediate result and the output of the function model; and in response to an anomaly detection, validating a functionality of the function model and/or a functionality of the monitoring model to determine whether a detected anomaly is due to an incorrect execution of the function model or to an abrupt change of the input data.

2. The method as recited in claim 1, further comprising:

determining a reference output based on a reference input using the function model; and checking the reference output including comparing the reference output to ground truth data, using the monitoring model.

3. The method as recited in claim 2, wherein the determination of a reference output based on a reference input using the function model, and the comparing of the reference output to the ground truth data using the monitoring model, are executed periodically.

4. The method as recited in claim 1, further comprising:

providing a hash value using the monitoring model;

signing the hash value using the function model;

providing the signed hash value to the monitoring model; and checking the signed hash value including comparing the hash value to the hash value calculated from the signed hash value, using the monitoring model.

5. The method as recited in claim 4, wherein the signing of the hash value includes:

adding a signature to the hash value in the first processing step of the function model, and adding a further signature in at least one further processing step of the function model.

6. The method as recited in claim 1, further comprising:

monitoring a communication between a first instance on which the function model is executed and a further instance on which the monitoring model is executed.

7. A computer-implemented method for monitoring a function model for providing data for at least one function of a computer-controlled machine, the at least one function including an image recognition algorithm, the function model being configured to determine at least one intermediate result based on input data in at least one first processing step, and the function model being configured to determine an output of the function model based on the intermediate result in at least one further processing step, the method comprising the following steps:

providing the intermediate result and the output of the function model to a monitoring model for anomaly detection;

carrying out anomaly detection based on the intermediate result and the output of the function model;

validating a functionality of the function model and/or a functionality of the monitoring model;

providing a hash value using the monitoring model;

signing the hash value using the function model;

providing the signed hash value to the monitoring model; and checking the signed hash value including comparing the hash value to the hash value calculated from the signed hash value, using the monitoring model, wherein, as a function of a result of the anomaly detection and/or as a function of a result of the monitoring of a communication, at least one of the following steps is executed:

a) checking a result of the comparison of the reference output to the ground truth data using the monitoring model, b) checking a result of the comparison of the hash value to the hash value calculated from the signed hash value, using the monitoring model, c) providing a control signal for activating at least a part of the computer-controlled machine, and/or a function of the computer-controlled machine, d) transferring at least a part of the computer-controlled machine, and/or a function of the computer-controlled machine, to a defined state, e) transferring at least the part of the computer-controlled machine, and/or the function of the computer-controlled machine to the defined state as a function of a result from step a) and/or step b).

8. A system for monitoring a function model for providing data for at least one function of a computer-controlled machine, the at least one function including an image recognition algorithm, the function model being configured to determine at least one intermediate result based on input data in at least one first processing step, and the function model being configured to determine an output of the function model based on the intermediate result in at least one further processing step, the system being configured to perform the following steps using a monitoring model:

providing the intermediate result and the output of the function model to a monitoring model for anomaly detection, carrying out anomaly detection based on the intermediate result and the output of the function model, and in response to an anomaly detection, validating a functionality of the function model and/or a functionality of the monitoring model to determine whether a detected anomaly is due to an incorrect execution of the function model or to an abrupt change of the input data, at least those of the steps that are executed using the monitoring model being executed on at least one first instance of the system, and the function model being executed on at least one second instance of the system.

9. The system as recited in claim 8, wherein at least the first instance meets an Automotive Safety Integrity Level (ASIL) according to ISO standard 26262.

10. The system as recited in claim 8, wherein the first instance and the second instance are each an instance of a common System-on-Chip (SoC), an operating system that is assigned to the first instance being executable on a separate computing core of the System-on-Chip.

11. The system as recited in claim 8, wherein a hypervisor virtualizes a hardware level, and the first instance is a first domain provided by the hypervisor and the second instance is a further domain provided by the hypervisor.

12. The system as recited in claim 8, wherein:

the system is used in a computer-controlled machine, the computer-controlled machine being: i) an E/E system of a motor vehicle for providing functions of autonomous driving, semiautonomous driving, and/or driver assistance functions, or ii) a robot, or iii) a domestic appliance, or iv) a power tool, or v) a manufacturing machine, or vi) a device for automatic optical inspection, or vii) an access system;

the function model in the computer-controlled machine providing data for at least one function of the computer-controlled machine based on input data including image data of an image sensor including a video, or radar, or LiDAR, or ultrasonic, or movement, or thermal imaging sensor data;

at least one control signal for executing the function of the computer-controlled machine being provided based on the provided data; and at least a part of the computer-controlled machine, and/or a function of the computer-controlled machine being transferred to a defined state.

* * * * *